(12) United States Patent  (10) Patent No.: US 8,984,433 B2
Martone et al.  (45) Date of Patent: Mar. 17, 2015

(54) GRAPHICAL REPRESENTATION OF TABULAR DATA

(75) Inventors: Peter Francis Martone, Seattle, WA (US); David James, Snohomish, WA (US); Jeff Liu, Bellevue, WA (US); Ransom VanOrman, Issaquah, WA (US); Jun Wang, Bellevue, WA (US); Sobia Tariq, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 1732 days.

(21) Appl. No.: 11/869,919

(22) Filed: Oct. 10, 2007

(65) Prior Publication Data

US 2009/0100370 A1 Apr. 16, 2009

(51) Int. Cl.
*G06F 3/048* (2013.01)
*G06T 11/20* (2006.01)
*G06F 17/24* (2006.01)
*G06F 17/30* (2006.01)

(52) U.S. Cl.
CPC ............ *G06F 17/246* (2013.01); *G06F 17/245* (2013.01); *G06F 17/30398* (2013.01); *G06F 17/30572* (2013.01)
USPC ............................ 715/777; 715/771; 345/440

(58) Field of Classification Search
CPC ........ G06T 11/206; G06F 3/0481; G06F 8/34
USPC .................. 715/771, 777, 227, 765; 345/440, 345/440.2; 340/870.01
See application file for complete search history.

(56) References Cited

U.S. PATENT DOCUMENTS

| 5,461,708 | A | * | 10/1995 | Kahn ............................. 345/440 |
| 5,627,764 | A | | 5/1997 | Schutzman et al. |
| 5,655,118 | A | | 8/1997 | Heindel et al. |
| 5,768,552 | A | | 6/1998 | Jacoby |
| 5,894,311 | A | * | 4/1999 | Jackson ......................... 345/440 |
| 6,075,530 | A | * | 6/2000 | Lucas et al. .................... 715/804 |
| 6,529,217 | B1 | * | 3/2003 | Maguire et al. ............... 715/769 |
| 6,684,213 | B1 | | 1/2004 | Schell et al. |
| 6,943,793 | B2 | * | 9/2005 | Bowser et al. .............. 345/440.2 |
| 7,072,934 | B2 | | 7/2006 | Helgeson et al. |
| 7,107,268 | B1 | | 9/2006 | Zawadzki et al. |
| 2002/0118192 | A1 | * | 8/2002 | Couckuyt et al. ............. 345/440 |
| 2002/0129054 | A1 | * | 9/2002 | Ferguson et al. ............. 707/503 |
| 2003/0009540 | A1 | | 1/2003 | Benfield et al. |
| 2004/0015367 | A1 | | 1/2004 | Nicastro et al. |
| 2005/0099422 | A1 | * | 5/2005 | Bowser et al. ................ 345/440 |
| 2005/0262194 | A1 | | 11/2005 | Mamou et al. |

(Continued)

OTHER PUBLICATIONS

"Installing Configuration Manager 2007", 2007 Aidan Finn, pp. 107.

(Continued)

*Primary Examiner* — Haoshian Shih
(74) *Attorney, Agent, or Firm* — Jim Skefas; Kate Drakos; Micky Minhas

(57) ABSTRACT

An enterprise management system may present data in a user interface that contains tabular data and a graphical representation of the tabular data. The graphical representation may change based on portions of the tabular data that may be selected, and may show a graphical data summary if no rows are selected, or detailed graphical illustrations of the selected rows. In some cases, filters may be applied to the data, and a selection tool may enable a user to select from several different parameters in each row.

20 Claims, 3 Drawing Sheets

(56) References Cited

U.S. PATENT DOCUMENTS

2006/0031180 A1* 2/2006 Tamarkin et al. ........ 340/870.02
2006/0070010 A1   3/2006 Retlich
2007/0132779 A1   6/2007 Gilbert et al.
2008/0163091 A1* 7/2008 Busse .......................... 715/771
2009/0109056 A1* 4/2009 Tamarkin et al. ........ 340/870.02

OTHER PUBLICATIONS

Johnson, "The importance of systems management for a Parallel Sysplex", vol. 36, No. 2, 1997, pp. 1-15.

* cited by examiner

GRAPHICAL REPRESENTATION OF TABULAR DATA

BACKGROUND

Many applications collect data and store data in a tabular form. In many cases, such application may use a database to store, sort, and manipulate the data. Tabular data is easy to manipulate with a computer, but can be difficult to comprehend and grasp for a human who may wish to analyze the data.

Enterprise management systems may be deployed to monitor and manage many computer systems throughout an organization such as a company. In many such systems, data may be collected for each monitored device and may be displayed in tabular form. An example of such a table may include various data parameters that are collected for various monitored devices or services. Such a table may have rows assigned for each device or service listed with a selection of measured or calculated parameters listed in columns across the table.

SUMMARY

An enterprise management system may present data in a user interface that contains tabular data and a graphical representation of the tabular data. The graphical representation may change based on portions of the tabular data that may be selected, and may show a graphical data summary if no rows are selected, or detailed graphical illustrations of the selected rows. In some cases, filters may be applied to the data, and a selection tool may enable a user to select from several different parameters in each row.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
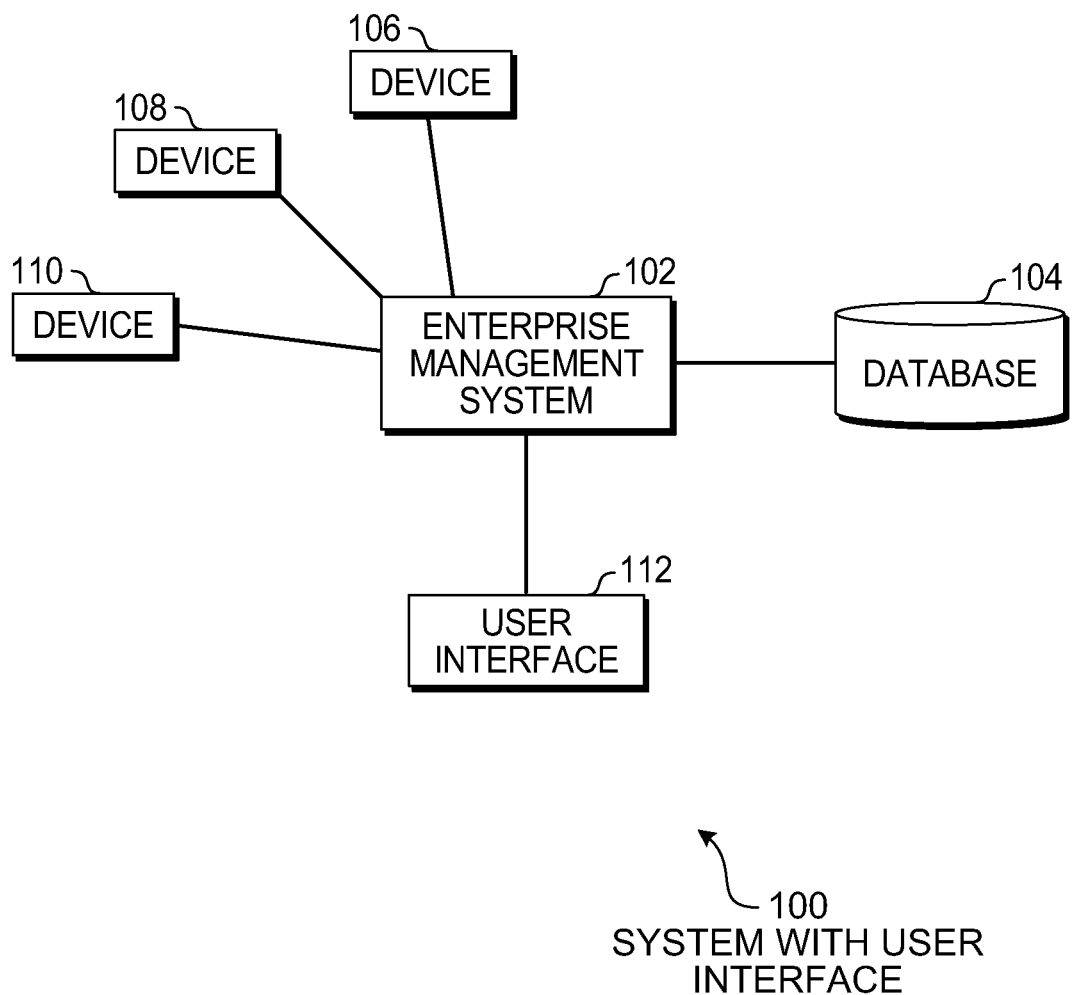
FIG. 1 is a diagram illustration of an embodiment showing a system with a user interface.

An interactive user interface for an enterprise management system may have two portions: a tabular data portion and a graphical representation portion. The graphical representation portion may display some or all of the data from the tabular data portion, depending on which portions of the tabular data that may be selected.

An enterprise management system may be used to monitor, configure, and manage computer and network devices over a large organization, such as a company or other large enterprise. In many cases, an enterprise management system may be used to monitor and control thousands or even hundreds of thousands of computers and other devices. Such management systems may collect data from many sources and may present the data to a manager or administrator in multiple formats.

The interactive user interface may enable a manager or administrator to navigate and analyze the data by examining various facets of the data. The data may be presented in a tabular form. Each row of a table may have a record relating to a device, service, application, or other monitored feature. The row may have several data parameters that may include any type of data in any format. In many cases, numerical, categorical, or text data may be used.

When no rows of the table are selected, a graphical representation of a summary of all the rows may be created and presented along with the tabular data. When one row is selected, a graphical representation of the row may be presented. When two or more rows are selected, a graphical representation of each row may be shown.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a user interface. Embodiment 100 is an example of a system that may have a user interface for an application. In the case of embodiment 100, an enterprise management system 102 may have a database 104 which may store data collected from devices 106, 108, and 110. The user interface 112 may be used to navigate through the data in various manners.

The enterprise management system 102 may be a large scale application that monitors many devices across a department, division, or an entire enterprise. Some such systems may be used to monitor hundreds of thousands of devices across very large, multinational companies or for large governmental departments, for example. On a smaller scale, such systems may be used in organizations with several dozen devices.

The enterprise management system 102 may collect data from many different devices 106, 108, and 110 using a variety of mechanisms. In some cases, the enterprise management system 102 may probe or query the devices. In other cases, the devices may have a daemon or local application that gathers and transmits data. Other mechanisms may also be used.

The enterprise management system 102 may operate on a single host device, such as a server, or may be spread across several devices. When the enterprise management system 102 operates across several devices, one device or cluster of devices may perform a specific function, such as data collection, while another device or group of devices may perform a different function, such as data analysis.

The enterprise management system 102 is used in embodiment 100 as an example of an application that may have data to be displayed. Other embodiments may have a user interface 112 that may connect with different types of applications, from simple spreadsheet applications, database applications, to large customer resource management applications, or any other type of application that may present data in a tabular format.

The user interface 112 may be provided through various mechanisms. For example, some embodiments may have a device with a processor that may operate an application that creates the user interface on a locally attached display. Other embodiments may have a web interface through which a browser operated on a client device may connect to a server that creates a user interface that is displayed on the client. Still other embodiments may have different system architectures that enable a processor to create a user interface that is displayed on a display device.

The user interface 112 may be displayed on any type of display device. A general purpose graphical display such as a CRT or LCD may be used in many cases. Some displays may be capable of multiple colors while others may be a mono color display.

Each user interface may also have various types of input devices to interact with the user interface. Examples of input devices may include keyboards, pointing devices such as a mouse, stylus, touchpad, touchscreen, trackball, or any other input device.

Figure 2:
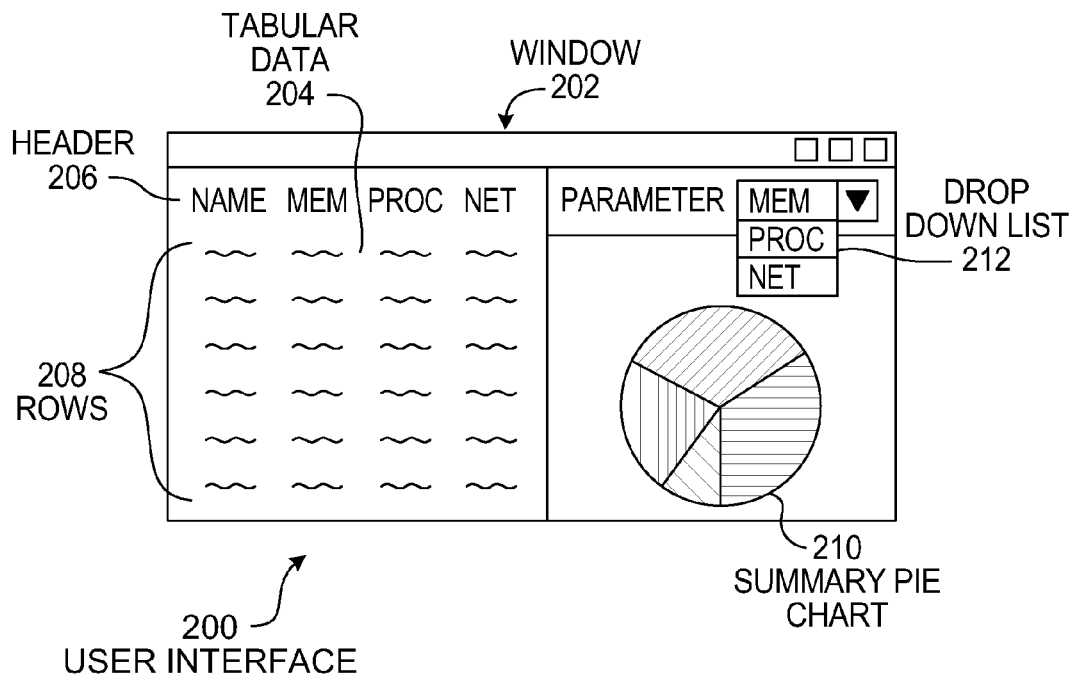
FIG. 2 is a diagram illustration of an embodiment showing a user interface with a summary graphical representation.

FIG. 2 is a diagram illustration of an embodiment 200 showing a user interface. Embodiment 200 is an example of a user interface that for which tabular data and a graphical representation of tabular data may be shown. Other embodiments may use different layouts, different fit and finish, different sizes and proportions, or other variations while still having the functionality described herein.

The window 202 may be a portion of a user interface that displays data from an application, such as an enterprise management system. The window 202 may contain an area of tabular data 204 that contains a header 206 and several rows of data 208. In many cases, various parameters may be displayed in each row.

In some cases, the parameters displayed may be summary statistics that encompass or summarize many other pieces of data. For example, a data value for downtime for a device may be displayed in the tabular data 204 that may be a total value of downtime, but the value may have been computed from analyzing a large volume of data points.

The summary pie chart 210 is an example of various graphical representations that may be made from the tabular data 204. Any type of graphical representation may be used, including bar charts, stacked bar charts, line charts, pie charts, timeline diagrams, scatter diagrams, or any other chart. In some cases, data may be mapped to a geographic map or other type of map.

In many embodiments, when no items are selected from the tabular data 204, the graphical representation may show an overall summary of the tabular data 204.

The graphical representation of the tabular data 204 may be shown in a default view. In some embodiments, a drop down list 212 may be used to change the graphical representation from one data parameter to another.

Figure 3:
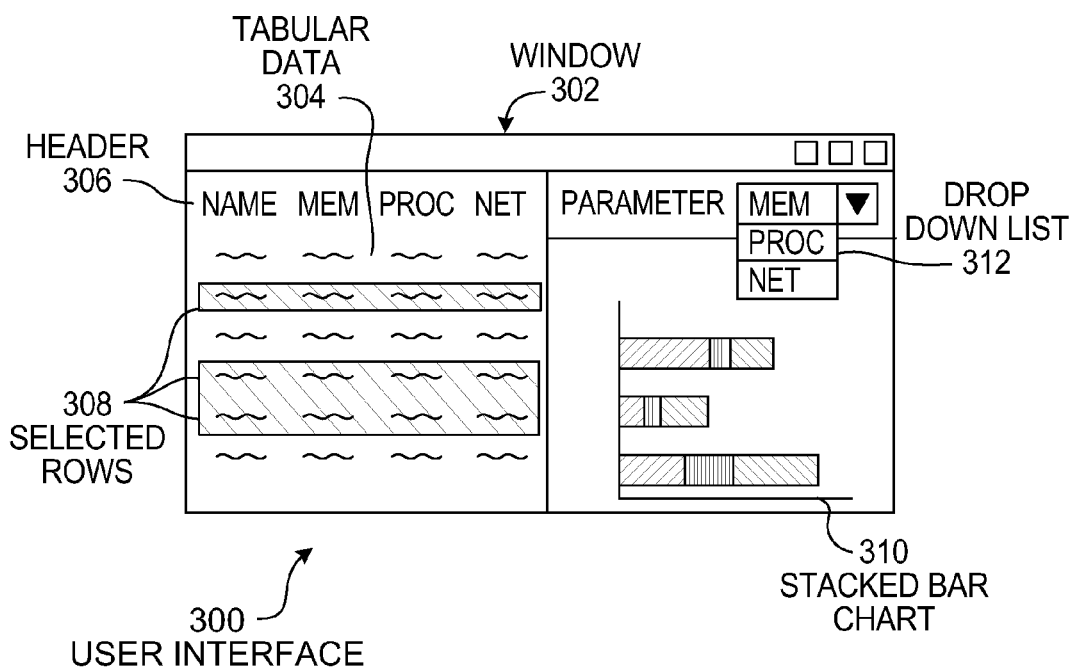
FIG. 3 is a diagram illustration of an embodiment showing a user interface with detailed graphical representation of selected items.

FIG. 3 is a diagram illustration of an embodiment 300 showing a user interface. Embodiment 300 is an example of a user interface that for which tabular data and a graphical representation of tabular data may be shown. Other embodiments may use different layouts, different fit and finish, different sizes and proportions, or other variations while still having the functionality described. Embodiment 300 is an example similar to embodiment 200 where several rows of data are selected.

The window 302 may be a portion of a user interface that displays data from an application. The window 302 may contain an area of tabular data 304 that contains a header 306 and several selected rows of data 308.

The selected rows of data 308 may be selected using any type of user interface interaction. In some instances, a mouse or other pointing device may be used to select each row separately. In other instances, a keyboard or other input device may be used separately or in conjunction with a pointing device to select various rows.

When the rows are selected, the rows may be highlighted or changed in some fashion so that a user may know which rows are selected. Such embodiments may be able to change the color of a selected row, shade the row a different color, or use some other highlighting mechanism. In some embodiments, a checkbox, radio button, or other display mechanism may be used to indicate a selected row.

The graphical representation in embodiment 300 may be a stacked bar chart 310. A stacked bar chart or some other representation of the data may be used that shows some underlying data behind a summary figure shown in the tabular data. In the case of a stacked bar chart, a summary data value may be the sum of three other data values, each of which may be represented as a different color or shading on the stacked bar chart 310.

The stacked bar chart 310 may represent one of the data values presented in one of the columns of the tabulated data 304. A drop down list 312 may be used to change from one data parameter to another in some embodiments.

By using a graphical representation that shows background or summary statistics, a detailed view of each selected item may be illustrated, which may highlight lower level data than what may be displayed in the tabulated data 304.

By combining embodiments 200 and 300, a graphical representation of three levels of data may be illustrated. In embodiment 200, the graphical representation of a summary of the tabulated data may be shown as a first level of data presentation. When one or more of the rows of the tabulated data are selected, each row may be displayed separately in the stacked bar chart, which may illustrate a second and third level of data. The second level of data may be illustrated by the relative length of the bars in the stacked bar chart 310. In this level, a direct comparison between several selected items may be performed. On a third level, the components that make up the second level data may be illustrated in the stacked bar chart.

Figure 4:
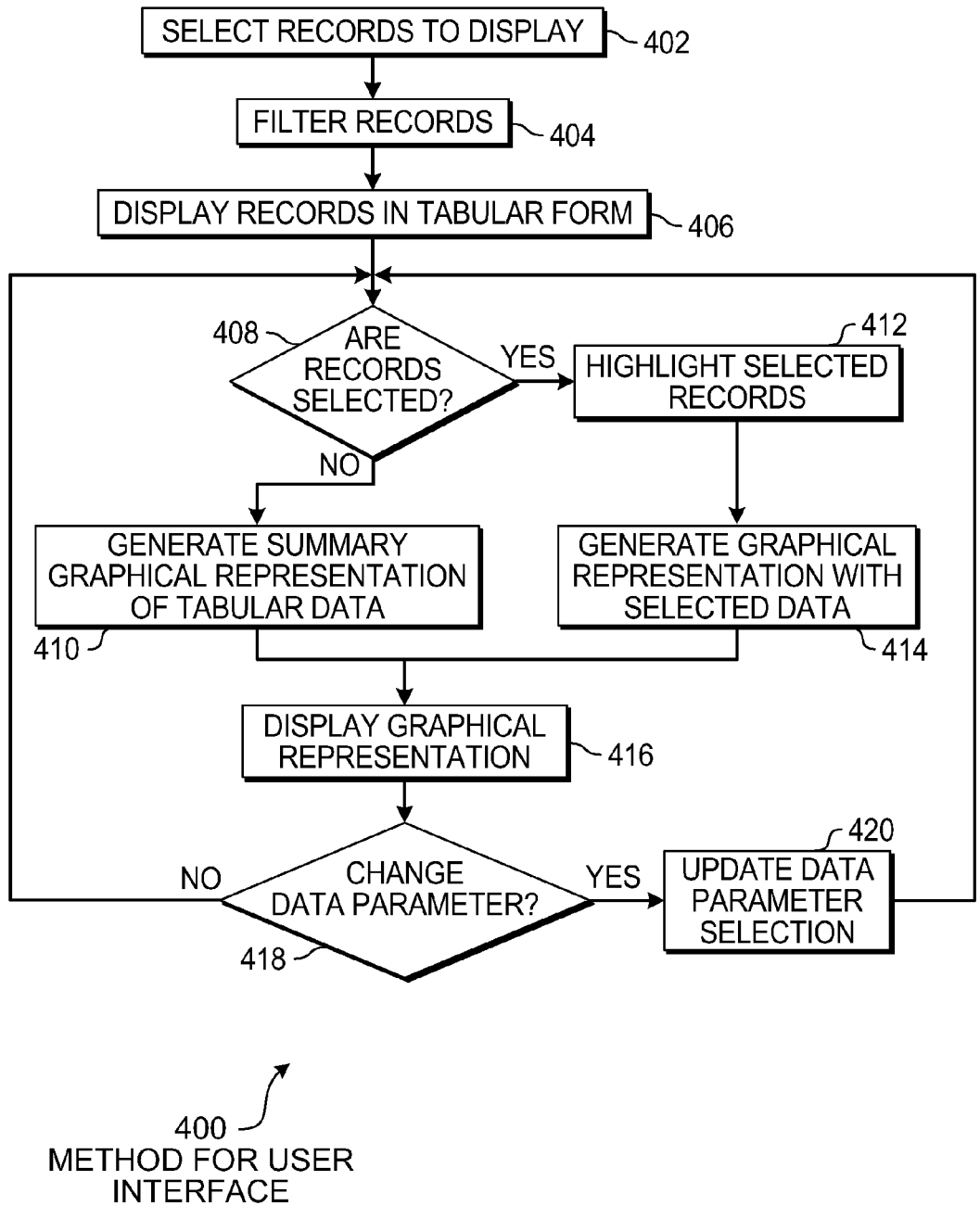
FIG. 4 is a flowchart illustration of an embodiment showing a method for generating a user interface.

FIG. 4 is a flowchart illustration of an embodiment 400 showing a method for a user interface. Embodiment 400 is one example of a method by which data records may be organized and presented in tabular form, and by which a graphical representation of some or all of the data may be presented.

Other embodiments may use different terminology, nomenclature, sequences, or steps, and some may include additional or fewer steps to accomplish the functionality described in embodiment 400.

Records are selected for display in block 402. In many cases, a database query may be performed to retrieve records for display.

The records may be filtered in block 404. In some embodiments, many records may be retrieved from a database and loaded into memory in block 402, but a user may be able to apply a filter in block 404. In such embodiments, a larger set of data may be loaded into local memory than may be displayed. The filter of block 404 may be a filter selected by a user that defines a subset of the retrieved records to be shown. In some embodiments, various predefined filters may be defined for a standard set of data views, for example. Such filters may be selected within an application that presents a user interface.

The records may be displayed in tabular form in block 406. In some embodiments, the tabular form may include a record name or identifier and one or more data parameters for the record. When the records are retrieved and filtered, some of the retrieval and filter conditions may refer to one or more of the data parameters for the records.

When data records are displayed in tabular form, there may be many different parameters associated with each data record. In some embodiments, a subset of the parameters may be displayed. Some embodiments may additionally include summary parameters that may summarize several other parameters within a record.

For example, a record for an enterprise management system may contain performance data for a device connected to a network. The record may contain many parameters, several of which indicate the health or overall performance of the device. In the record displayed in tabular form for the device, a summary statistic may be generated that summarizes the several health parameters into a single summary parameter.

If no records are selected in block 408, a summary graphical representation of the tabular data may be generated in block 410 and displayed in block 416. The summary graphical representation may summarize the tabular data using an overview graphic. An example of the graphic may be locations of devices that are mapped to a geographical illustration, a summary pie chart of categories of records, or some other graphical representation of the records.

If one or more records are selected in block 408, the records may be highlighted in block 412 and a graphical representation of the selected data may be generated in block 414 and displayed in block 416.

As records are selected, the records may be highlighted by several different mechanisms. In some embodiments, the highlighted records may be shaded, presented in different color, have a different background color, or some other graphical highlighting. In some embodiments, a checkbox, radio button, or other input device may be used to select the various records and indicate the record status as selected or not.

The graphical representation of selected data in block 414 may include a detailed breakdown of one or more parameters associated with the selected records. For example, a record may include one or more parameters that are summary statistics. The summary statistics may be based on calculations performed on several other data points.

An example of such a summary statistic may be a device's data storage performance index. The performance index may be calculated by a formula based on several performance parameters such as maximum data transfer rates, degree of fragmentation of a data storage device, and other parameters. When an embodiment may display a device's data storage performance index, a stacked bar chart, pie chart, or other graphical representation may include a graphical representation of the components that make up the data storage performance index.

After the graphical representation is displayed in block 416, a user may change a data parameter in block 418. Such a change may select a parameter in another column of the tabular data. In some embodiments, such as embodiment 200, a drop down list 212 or other user interface selection device may be used to select the appropriate parameter. In some embodiments, a user may be able to select and highlight a column within the tabular display to indicate the parameter about which a graphical representation may be created.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
    selecting a group of records to be displayed from a database, each of said group of records having at least one data parameter;
    displaying said group of records in tabular form in a first part of a user interface, the tabular form including at least one column, the at least one column associated with a select one of the at least one data parameter;
    when none of said records are selected, displaying a summary graphical representation of said group of records in a second part of said user interface simultaneously with said first part of said user interface, the summary graphical representation comprising a first selection mechanism displayed in the summary graphical representation to select between the data parameters;
    when one or more of said records are selected, displaying a graphical representation of said one or more of said records simultaneously with said first part of said user interface, the graphical representation comprising a second selection mechanism displayed in the graphical representation to select between the data parameters; and
    changing the graphical representation or summary graphical representation based on a selection of a data parameter received through a respective selection mechanism.

2. The method of claim 1 further comprising:
    filtering said group of records into a subset of said records.

3. The method of claim 1, wherein the graphical representation is one of a bar chart, stacked bar chart, line chart, pie chart, timeline diagram, scatter diagram, or geographic map.

4. The method of claim 1, wherein the summary graphical representation is one of a bar chart, stacked bar chart, line chart, pie chart, timeline diagram, scatter diagram, or geographic map.

5. The method of claim 1, wherein the group of records includes status information of devices associated with an enterprise management system.

6. The method of claim 1, said graphical representation comprising separate representations for each of said records that are selected.

7. The method of claim 1, said graphical representation comprising an aggregated representation of the one or more records that are selected.

8. The method of claim 1, wherein the group of records are displayed in one or more rows of the tabular form.

9. The method of claim 1, further comprising: changing the summary graphical representation based on a selection of one or more of the group of records displayed in the first part of the user interface.

10. The method of claim 1, wherein said selection mechanism is a drop down list, the drop down list including one or more of the data parameters.

11. A system comprising:
    an enterprise management system that determines status information from a plurality of devices and stores said status information in records in a database;
    a user interface for said enterprise management system that:
        selects a group of said records to be displayed from said database, each of said group of records having at least one data parameter;
        displays said group of records in a tabular form in a first part of a user interface, the tabular form including at least one column, the at least one column associated with a select one of the at least one data parameter;
        when none of said records are selected, displays a summary graphical representation of said group of records in a second part of said user interface simultaneously with said first part of said user interface,
        when one or more of said records are selected, displays a graphical representation of said one or more of said records simultaneously with said first part of said user interface;
        changes the graphical representation or summary graphical representation based on a selection of a data parameter; and
        wherein the graphical representation comprises a first selection mechanism displayed in the graphical representation to select between the data parameters,
        wherein the summary graphical representation comprises a second selection mechanism displayed in the summary graphical representation to select between the data parameters.

12. The system of claim 11, said user interface being further adapted to:
    filter said group of records into a subset of said records.

13. The system of claim 11, wherein the first selection mechanism includes each of the data parameters.

14. The system of claim 11, wherein the second selection mechanism includes each of the data parameters.

15. The system of claim 11, wherein the graphical representation is one of a bar chart, stacked bar chart, line chart, pie chart, timeline diagram, scatter diagram, or geographic map.

16. The system of claim 11, said graphical representation comprising separate representations for each of said records that are selected.

17. The system of claim 11, said graphical representation comprising an aggregated representation of said one or more records.

18. The system of claim 11, further comprising: changing the summary graphical representation based on a selection of one or more of the group of records displayed in the first part of the user interface.

19. A method comprising:
    receiving messages from a plurality of monitored devices, each of said messages comprising a device status;
    creating data records from said messages;
    storing said data records in a database;
    selecting a group of said data records to be displayed from a database, each of said group of data records having at least one data parameter;
    displaying said group of data records in a tabular form in a first part of a user interface, the tabular form including at least one column, the at least one column associated with a select one of the at least one data parameter;
    when none of said data records are selected, displaying a summary graphical representation of said group of data records in a second part of said user interface simultaneously with said first part of said user interface; and
    when one or more of said data records are selected, displaying a graphical representation of said one or more of said data records simultaneously with said first part of said user interface;
    changing the graphical representation or summary graphical representation based on a selection of a data parameter,
    wherein the graphical representation comprises a first selection mechanism displayed in the graphical representation to select between the data parameters,
    wherein the summary graphical representation comprises a second selection mechanism displayed in the summary graphical representation to select between the data parameters.

20. The method of claim 19, wherein the summary graphical representation comprises a selection mechanism, the selection mechanism displayed on the summary graphical representation to enable a user to change a data parameter associated with the group of data records.

* * * * *